UNITED STATES PATENT OFFICE.

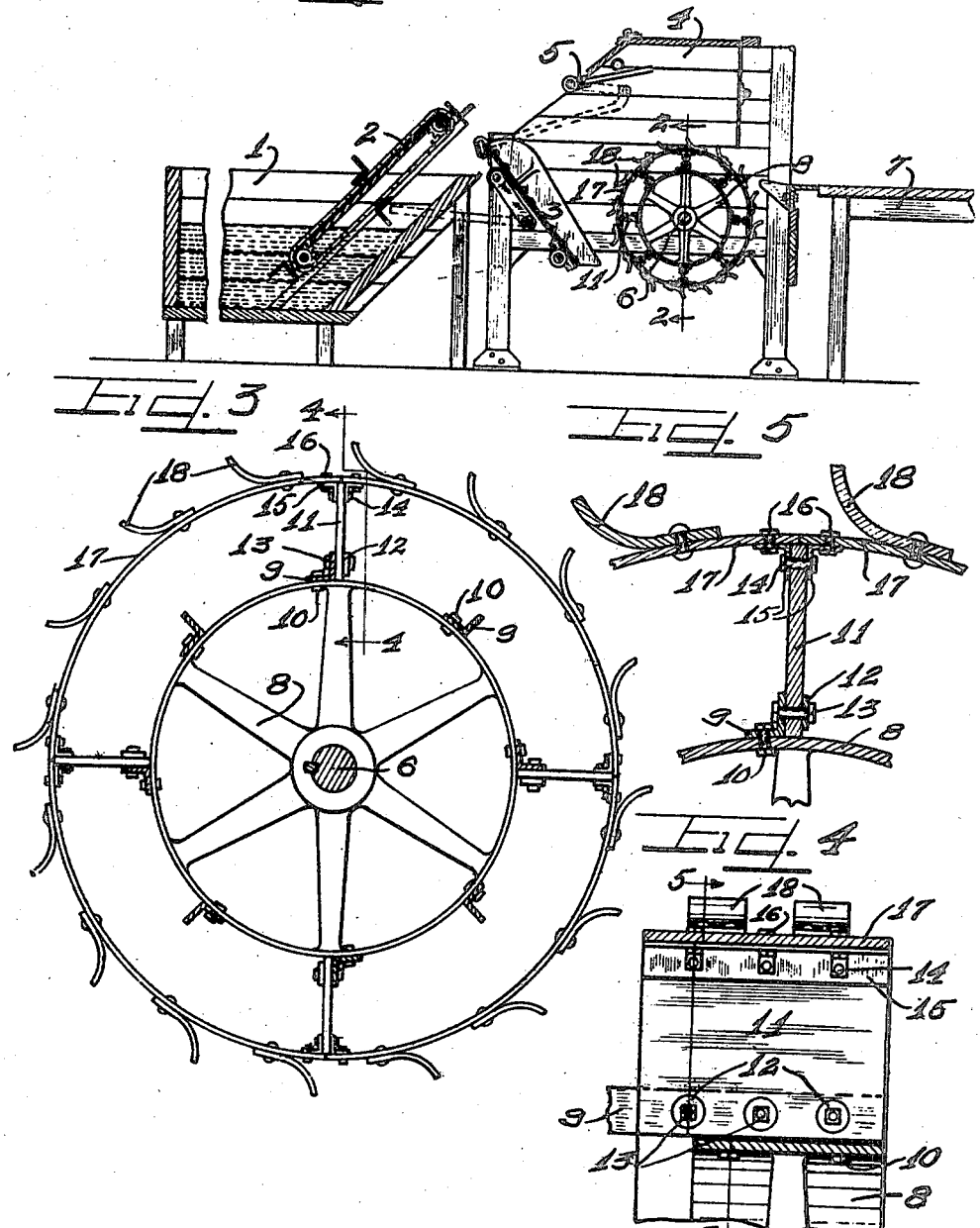

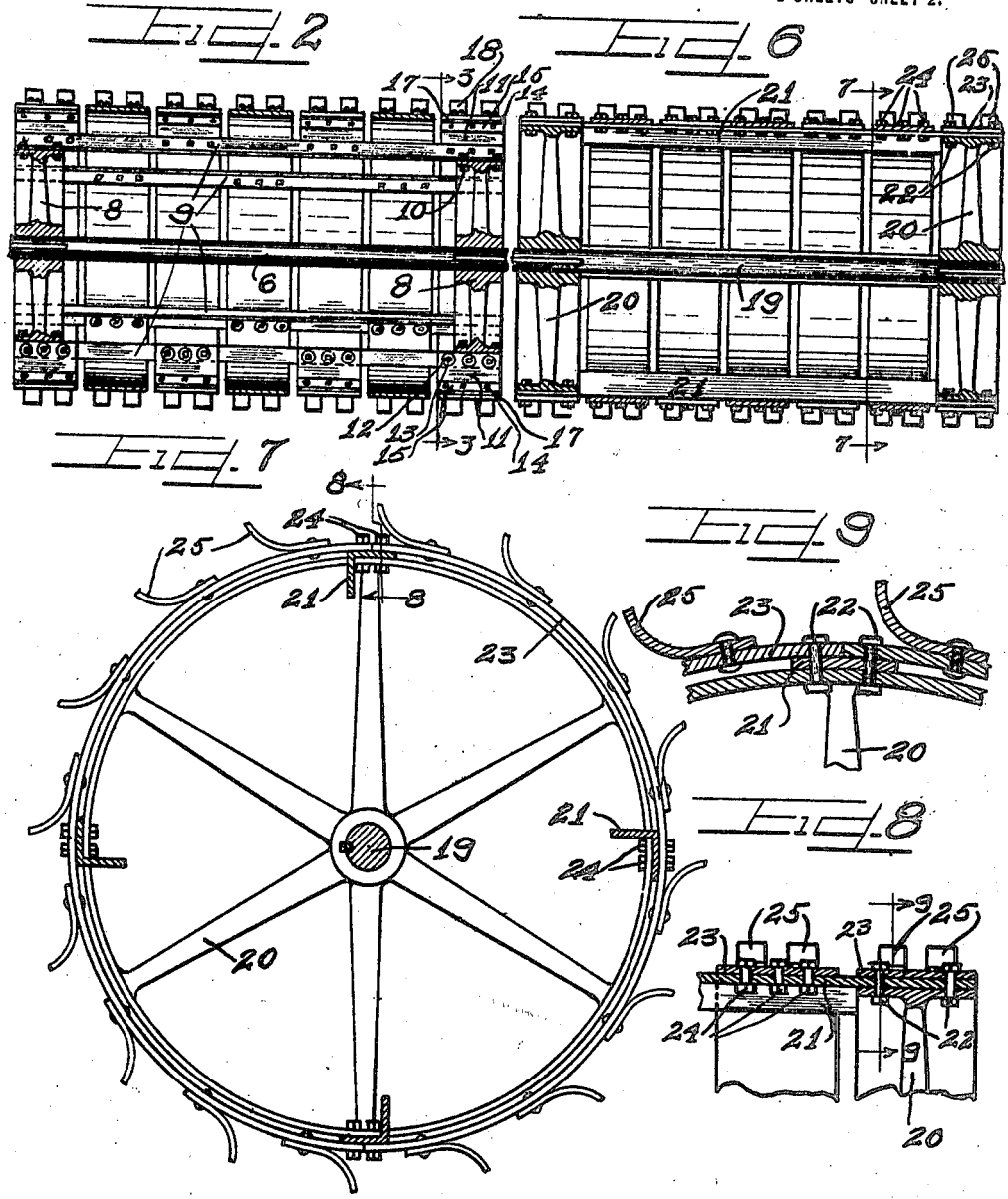

JOHN W. KOHLHEPP, OF CHICAGO, ILLINOIS, ASSIGNOR TO THE ALLBRIGHT-NELL CO., A CORPORATION OF ILLINOIS.

FLEXIBLE CARCASS-SCRAPING DRUM.

1,323,639.     Specification of Letters Patent.     Patented Dec. 2, 1919.

Application filed June 6, 1918. Serial No. 238,477.

*To all whom it may concern:*

Be it known that I, JOHN W. KOHLHEPP, a citizen of the United States, and a resident of the city of Chicago, in the county of Cook and State of Illinois, have invented certain new and useful Improvements in Flexible Carcass-Scraping Drums; and I do hereby declare that the following is a full, clear, and exact description of the same, reference being had to the accompanying drawings, and to the numerals of reference marked thereon, which form a part of this specification.

This invention relates to an improved form of a flexible carcass scraping and dehairing device adapted to be rotatably mounted to clean and dehair carcasses disposed in the field of operation of the device when rotated.

It is an object of this invention to provide a flexible scraping wheel or drum provided with scraping means for dehairing a carcass.

Another object of the invention is the construction of a carcass scraping wheel provided with a flexible rim for supporting scraper blades.

It is also an object of the invention to construct a carcass scraping drum provided with flexible spokes and a flexible rim for supporting scraping blades in position thereon.

A further object of the invention is the construction of a rotatable flexible rim scraper drum.

It is furthermore an object of the invention to provide a carcass scraping drum provided with a rigid inner hub framework and a flexible outer rim for supporting scraper blades peripherally thereon.

Another object of the invention is the construction of a carcass scraping drum or wheel wherein a rigid support has a flexible belt rim secured thereto upon which scraping blades are circumferentially mounted.

It is also an object of the invention to provide a carcass scraping device wherein a rigid drum support is provided with flexible spokes and rims affording a resilient support for scraper blades.

It is an important object of this invention to construct a carcass scraping device having flexible spokes and rims acting to support peripheral scraping blades.

A further important object of the invention is the construction of a flexible rimmed rotatable carcass dehairing device having a rigid support.

Other and further important objects of this invention will be apparent from the disclosures in the specification and drawings.

The invention (in a preferred form) is illustrated in the drawings and hereinafter more fully described.

On the drawings:

Figure 1 is a longitudinal sectional view of a carcass cleaning machine equipped with a flexible scraping device embodying the principles of this invention.

Fig. 2 is an enlarged detail section taken on line 2—2, of Fig. 1.

Fig. 3 is an enlarged sectional view taken on line 3—3, of Fig. 2.

Fig. 4 is an enlarged fragmentary section taken on line 4—4, of Fig. 3.

Fig. 5 is a section taken on line 5—5, of Fig. 4.

Fig. 6 is a sectional view similar to that shown in Fig. 2, of a modified form of a flexible carcass scraping drum.

Fig. 7 is an enlarged sectional view taken on line 7—7, of Fig. 6.

Fig. 8 is an enlarged fragmentary detail section taken on line 8—8, of Fig. 7.

Fig. 9 is an enlarged section taken on line 9—9, of Fig. 8.

As shown on the drawings:

The reference numeral 1, indicates a scalding vat, provided with a conveyer 2, adapted to deliver scalded carcasses upon an adjustable chute 3, which is pivotally mounted within a carcass cleaning machine 4, disposed to the rear of the scalding vat. The cleaning machine is provided with a carcass fall breaking mechanism 5, adapted to be manually operated to break the fall of carcasses entering the machine on the chute 3, to prevent the entering carcasses from striking against the carcass cleaning and dehairing mechanism or drum with too much force.

The carcass cleaning and dehairing mechanism or drum embraces an axle or shaft 6, which projects transversely through the machine 4, and has the ends thereof journaled in suitable bearings mounted on the machine framework. The shaft 6, is connected with any suitable driving means for rotating the same and the scraping device secured thereon. Keyed or otherwise secured on the shaft 6, within the machine 4, is a flexible carcass scraping drum mechanism, adapted to co-act with the adjustable chute 3, for cleaning and dehairing carcasses and by adjustment of said chute causing the cleaned carcasses to be discharged over the drum through the open rear portion of the machine upon a receiving table or platform 7, disposed to the rear of the cleaning machine.

The flexible scraping mechanism or drum comprises a pair of flat rimmed pulleys or wheels 8, which are keyed or otherwise secured on the shaft 6, adjacent the inner surfaces of the machine sides. Rigidly connecting the pulleys 8, together to form a hub or rigid support, are a plurality of spaced angle bars 9, which are disposed parallel to the shaft 6, and have the ends of one flange of each thereof removably secured to the rims of the rigid pulleys 8, by bolts or rivets 10, while the other flange of each bar projects radially from the pulley rims. Rigidly but removably secured to the projecting flanges of the angle bars 9, are a plurality of adjacently disposed flexible cleaning, massaging or scraping wheels, all of which are identical in construction and form the flexible scraping drum adapted not only to flex to conform to the bodies of carcasses, but also adapted to be moved outwardly into operating position by centrifugal force when the drum is rotated by the shaft 6. As shown in Fig. 2, alternate flexible scraping wheels are connected or secured to alternate angle bars.

Each flexible scraping wheel comprises a plurality of flexible radial arms or spokes 11, made of flexible belting or other suitable flexible material and having the lower ends thereof removably secured to the radial flanges of alternate angle bars 9, by means of washers 12, and bolts 13. Rigidly but removably secured on each side of the outer end of each of the flexible arms or spokes 11, by means of bolts 14, are the radial flanges of oppositely directed angle braces 15. Secured rigidly by means of bolts 16, or other suitable means to the peripheral flanges of the angle braces 15, at the outer ends of the flexible arms 11, are flexible rim strips or sections 17, made of flexible belting or other suitable material. The strips 17, form the rims of the flexible wheels, and each strip 17, has rigidly secured on the outer peripheral surface thereof a plurality of circumferentially disposed scraper blades 18, the free ends of which are curved outwardly. The scraper blades are preferably made of metal of any desired length, but if preferred said blades may be made of any other desired material.

In the modified form of flexible carcass scraping mechanism or drum shown in Figs. 6 to 9 inclusive, the reference numeral 19, indicates an axle or shaft having keyed or otherwise secured near each end thereof a flat rimmed pulley or wheel 20. Rigidly connecting the pulleys 20, together to form a rigid hub or support, are a plurality of spaced angle bars 21, which are disposed parallel to the shaft 19, and have the ends of the inwardly directed radial flanges thereof cut away to permit the ends of the peripheral flanges to engage over or rest upon the rims of the pulleys 20, and be secured thereto by rivets or bolts 22. Rigidly but removably secured to the peripherally disposed flanges of the angle bars 21, are a plurality of adjacently disposed flexible cleaning, massaging or scraping wheels, all of which are identical in construction and form the flexible scraping drum adapted not only to flex to conform to the bodies of carcasses, but also adapted to have the flexible portions thereof moved outwardly into operating position by centrifugal force when the drum is rotated.

Each of the modified flexible scraping wheels comprises a flat rim or belt 23, made of flexible strips of belting or other suitable material, which are secured to the peripheral flanges of the angle bars 21, by means of the bolts 22 and bolts 24. Rigidly secured on the outer peripheral surface of each flexible wheel rim 23, are a plurality of circumferentially disposed metal scraper blades 25, the free ends of which are curved outwardly and may be of any desired length. A flexible scraping drum is thus produced adapted to be flexed to conform to the shape of carcasses. When the drum is rotating and is flexed inwardly the centrifugal action of the rotating drum acts to move or force the deflected portions of the drum outwardly into operating position.

The operation is as follows:

With the flexible carcass scraping drum rotatably mounted in position within a sanitary silently operating cleaning machine, as shown in Fig. 1, the conveyer 2, is set in operation and the drum is caused to rotate by any suitable power means connected with the drum shaft 6. A carcass, after being properly scalded in the vat 1, is pushed onto the conveyer 2, and is delivered upon the pivoted chute 3, the mechanism 5, being moved into position to break the fall or downward movement of the delivered carcass on the chute 3, to prevent the entering carcass from striking against the flexible drum with too much force. The normal inclined position of the chute 3, permits the carcass to slide into the field of operation of the rotatable flexible scraping drum which acts to rotate the carcass and simultaneously scrape and dehair the same. The drum as it is contacted by the carcass flexes to conform to the shape of the carcass, and due to centrifugal action the flexed drum portions are again moved outwardly into operating position. The drum is capable of flexing considerably since the flexible rims 17, are adapted to be bent or flexed as the carcass is being acted upon. When the carcass has been sufficiently cleaned the chute 3, is tipped toward the drum, whereby the rotating drum acts to elevate the cleaned carcass and then discharge the carcass over the drum upon the table 7.

The modified form of flexible drum shown in Fig. 6, acts when rotated within the cleaning machine to scrape and dehair a carcass in a manner similar to that already described.

The scraper blades mounted on the flexible wheel belts or rims comprising the flexible drums, may be of any desired length and material, and if preferred may be staggered with respect to one another, or arranged in any suitable manner for effecting a proper cleaning of carcasses.

I am aware that numerous details of construction may be varied through a wide range without departing from the principles of this invention, and I therefore do not purpose limiting the patent granted otherwise than necessitated by the prior art.

I claim as my invention:

1. A carcass scraping drum comprising supporting rims, and flexible scraping rim members secured therearound.

2. A carcass scraping device embracing a rigid hub member, angle members thereon and a plurality of flexible rim members secured thereto in spaced relation to one another.

3. A carcass scraping device embracing rigid rim members, angle members secured thereto, a plurality of flexible rims secured thereto adjacent one another, and scraper blades secured on said flexible rims.

4. A carcass cleaning device comprising spaced pulleys, means rigidly connecting the rims of said pulleys together, flexible rim members secured on said means adjacent one another to form a drum, and scrapers secured on said flexible rim members.

5. A carcass dehairing device comprising spaced pulleys, angle bars rigidly connecting said pulleys together to form a support, and a plurality of flexible scraper wheels mounted on said support to form a flexible drum.

6. In a carcass cleaning device a rotatable hub member, flexible strips secured therearound to form a flexible drum, and a plurality of scraper blades secured circumferentially on said flexible drum.

7. In a carcass scraping device of the class described, rotatable rigid supporting rim, angle members securing said rims together, flexible rim belts secured to alternate angle members in spaced relation, and outwardly directed scraper blades secured circumferentially around said flexible rim belts.

8. A carcass scraping drum comprising rigid rotatable rims, bars connecting said rims together, flexible wheels mounted on said bars, and scraper blades mounted on said flexible wheels.

9. A carcass scraping device embracing a rigid pulley, angle members secured to the rim thereof, flexible radial arms secured to said angle members, flexible strips connected with said arms to form a flexible rim, and scraper blades secured on said flexible rim.

10. A carcass scraping device comprising a rigid pulley, angle members secured on the rim thereof, flexible radially directed arms secured to said angle members, angle braces secured to the outer ends thereof, flexible strips secured to said angle braces to form a flexible rim, and scraper blades secured circumferentially on said flexible rim.

11. A carcass cleaning device comprising a rigid inner rim, a flexible outer rim, and means connecting said rims.

12. A carcass cleaning device embracing a rigid inner rim, a flexible outer rim, and flexible radial means connecting said rims.

13. A carcass scraping device comprising a rigid rim, and a flexible scraper rim secured therearound.

14. A carcass scraping device comprising an inner wheel, and a flexible outer wheel secured to the rim of said inner wheel.

15. A carcass scraping device comprising a rigid inner wheel, a flexible outer wheel, means connecting the rim of the flexible outer wheel to the rim of said rigid inner wheel and holding the same spaced therefrom, and scraper blades on said flexible outer wheel.

16. A carcass scraping device comprising concentric rims, and scrapers on one of said rims.

17. A carcass scraping device comprising rigid and flexible rims, and scrapers secured on the flexible rim.

18. A carcass scraping device embracing concentric rims, means connecting the same, and scraper means on the outermost rim.

19. A carcass scraping device comprising co-axial rims of different material, and scraping members secured to the outermost rim.

20. A scraping device comprising a hub, spokes integral therewith, a rigid rim integrally formed on said spokes, a flexible rim concentric with said rigid rim, means securing said rims together, and scraping means mounted on said flexible rim.

21. A carcass scraping device comprising a plurality of connected concentric members, and scraping means on one of said members.

22. A carcass cleaning drum comprising spaced scraping wheels, members rigidly connecting said wheels together, and a plurality of scraping means secured to said members adjacent one another in spaced relation to form intermediate scraping wheels.

23. A carcass dehairing device comprising a shaft, scraping wheels secured on the ends thereof, a plurality of members connecting said wheels together, and scraping rims secured to said members between said wheels and adjacent one another in spaced relation to afford intermediate scraping wheels.

In testimony whereof I have hereunto subscribed my name in the presence of two subscribing witnesses.

JOHN W. KOHLHEPP.

Witnesses:
FRED E. PAESLER,
FRANK A. BREMER, Jr.